(12) United States Patent
Schanzenbach et al.

(10) Patent No.: US 11,650,606 B2
(45) Date of Patent: May 16, 2023

(54) METHOD FOR ACTUATING A VALVE, AND CORRESPONDING DEVICE

(71) Applicant: Robert Bosch GmbH, Stuttgart (DE)

(72) Inventors: Matthias Schanzenbach, Eberstadt (DE); Andreas Schmidtlein, Tamm (DE); Frank Haefele, Sachsenheim-Kleinsachsenheim (DE); Ruben Obenland, Grossbottwar (DE)

(73) Assignee: Robert Bosch GmbH, Stuttgart (DE)

( * ) Notice: Subject to any disclaimer, the term of this patent is extended or adjusted under 35 U.S.C. 154(b) by 171 days.

(21) Appl. No.: 17/048,663

(22) PCT Filed: Apr. 5, 2019

(86) PCT No.: PCT/EP2019/058591
§ 371 (c)(1),
(2) Date: Oct. 19, 2020

(87) PCT Pub. No.: WO2019/201620
PCT Pub. Date: Oct. 24, 2019

(65) Prior Publication Data
US 2021/0072773 A1 Mar. 11, 2021

(30) Foreign Application Priority Data

Apr. 20, 2018 (DE) ...................... 10 2018 206 114.9

(51) Int. Cl.
*G05B 19/41* (2006.01)
*G05D 7/06* (2006.01)
*G05B 19/4155* (2006.01)

(52) U.S. Cl.
CPC ....... *G05D 7/0635* (2013.01); *G05B 19/4155* (2013.01); *G05D 7/0623* (2013.01); *G05B 2219/45006* (2013.01)

(58) Field of Classification Search
CPC ............... G05D 7/0635; G05D 7/0623; G05B 19/4155; G05B 2219/45006
(Continued)

(56) References Cited

U.S. PATENT DOCUMENTS

2007/0139852 A1   6/2007  Reuter
2008/0042087 A1*  2/2008  Pfaff .................... H01F 7/1844
                                                              251/129.04
(Continued)

FOREIGN PATENT DOCUMENTS

CN        1832877 A     9/2006
CN      101952149 A     1/2011
(Continued)

OTHER PUBLICATIONS

International Search Report corresponding to PCT Application No. PCT/EP2019/058591, dated Aug. 30, 2019 (German and English language document) (5 pages).

*Primary Examiner* — Hien D Khuu
(74) *Attorney, Agent, or Firm* — Maginot, Moore & Beck LLP (57) ABSTRACT

A method for actuating a valve with an electromagnetic valve drive through which electric current is conducted to open or close the valve or to hold the valve in an open or closed position includes receiving an opening signal, determining an adapted opening signal which is adapted to physical limits of the valve or valve drive, and determining a feed-forward signal for feed-forward control of an electric current to drive the electromagnetic valve drive to open the valve in reaction to the adapted opening signal. The method further includes calculating an actuation signal for actuating the valve drive using the feed-forward signal, and outputting the actuation signal.

12 Claims, 8 Drawing Sheets

(58) Field of Classification Search
USPC .......................................................... 700/282
See application file for complete search history.

(56) References Cited

U.S. PATENT DOCUMENTS

2010/0036534 A1\* 2/2010 Ding .................... G05D 7/0635
706/14
2018/0259379 A1\* 9/2018 Copley ................. A61M 15/00

FOREIGN PATENT DOCUMENTS

| CN | 102947150 A | | 2/2013 | |
|---|---|---|---|---|
| CN | 103308288 | \* | 9/2013 | |
| CN | 104108387 A | | 10/2014 | |
| CN | 102465765 | \* | 12/2016 | |
| CN | 106989194 | \* | 7/2017 | |
| DE | 0261134 B1 | \* | 1/1991 | |
| DE | 3817770 C2 | \* | 11/1991 | |
| DE | 3636139 A1 | \* | 12/1994 | .............. B60T 13/66 |
| DE | WO99/10975 | \* | 3/1999 | |
| DE | 19848960 A1 | \* | 4/2000 | .............. B60T 13/68 |
| GB | 2 439 433 A | | 12/2007 | |
| JP | 2007-50742 A | | 3/2007 | |
| JP | 2008-25831 A | | 2/2008 | |
| WO | 2010/005601 A2 | | 1/2010 | |

\* cited by examiner

METHOD FOR ACTUATING A VALVE, AND CORRESPONDING DEVICE

This application is a 35 U.S.C. § 371 National Stage Application of PCT/EP2019/058591, filed on Apr. 5, 2019, which claims the benefit of priority to Serial No. DE 10 2018 206 114.9, filed on Apr. 20, 2018 in Germany, the disclosures of which are incorporated herein by reference in their entirety.

BACKGROUND

Modern braking control systems use electromechanical valves to implement pressure modulations in an ABS or ESP intervention (vehicle dynamics control interventions). The actuators used (for example, solenoid valves) are activated by means of an electric voltage, and hydraulic or pneumatic media or also mechanical components are thus controlled or regulated in accordance with their construction. Since more and more demands are being placed on these vehicle-dynamics interventions (pressure setting quality, reproducibility, dynamic response, noise when switching, etc.), more and more demands are thus also placed on their actuators. A very critical point in ABS and ESP systems is, inter alia, the braking performance (braking distance) and, in the case of comfort-relevant functions, the switching noise. The shorter the braking distance is supposed to be, the faster and more precisely the solenoid valves have to reach their setpoint value to meet the pressure specifications of the higher-order brake controller. The output stages of these valves are operated via regulated or unregulated voltage output stages.

SUMMARY

A method is to be described here for actuating a solenoid valve, which is optimized so that a setpoint value results very quickly (the current in the magnetic circuit of the valve here), without undesired overshoots occurring and without the system beginning to oscillate, or the valve can be actuated sufficiently slowly that it opens or closes as quietly as possible. The system described here is additionally robust against cross influences. Moreover, the system enables a relevant system variable (resistance of the coil) to be estimated via a model-supported approach and thus to be adapted quickly to existing conditions.

The method described here for actuating a valve having a magnetic valve drive, through which electric current is conducted in order to open the valve, close it, and hold it in an open or closed position, has the following steps:
a) receiving an opening signal,
b1) ascertaining an adapted opening signal which is adapted to physical limits of the valve or the valve drive,
b2) ascertaining a pilot control signal for the pilot control of an electric current to drive an electric valve drive to open the valve in reaction to the adapted opening signal,
c) calculating an actuation signal to actuate the valve drive using the pilot control signal, and
d) outputting the actuation signal.

The method is particularly preferred if it furthermore comprises the following step:
b3) receiving an electric current signal, which represents an electric current through the valve drive,
wherein the current signal received in step b3) is additionally used in step c) in the calculation of the actuation signal.

Solenoid valves, which are describable by the behavior of a PT1 element (R-L control loop), are typically used in braking control systems. In addition, a regulation of the solenoid valves takes place. This means that an actual current through the solenoid valves is measured and taken into consideration. This is necessary because greatly differing loads are present depending on the operating conditions. Different loads can be triggered, for example, by temperature-related changes of the coil resistance or by changes of the pressure in the lines. Changes of the pressure in the lines also comprise in particular dependencies of the pressure in the lines, which can be closed or released by the valve. The current through the solenoid valve therefore cannot be set solely using a controller. However, feedback in the actuation of the solenoid valves is present due to a typical current regulation. Feedback is accompanied by problems in principle. The most relevant problem is the susceptibility to oscillation of a regulation. Regulators require one or more regulation cycles to adjust the setpoint values. If regulators are used, it is therefore to be ensured that they are stable over the series tolerances.

In step a) of the described method, firstly an opening signal is received. An opening signal is a signal which relates to the opening state of the valve. It can be a signal for opening or a signal for closing the valve.

According to the method described here, after an opening signal is received in step a), a pilot control signal is ascertained/calculated in step b1) and b2). Depending on the type and design of the opening signal, a different actuation signal can be necessary. The pilot control signal is an estimated, particularly suitable actuation signal, using which the valve drive is actuated.

Steps b1) and b2) form a two-step process for determining the pilot control signal.

In step b1), an ascertainment of an adapted opening signal is carried out, which is adapted to physical limits of the valve or the valve drive.

In step b2), an ascertainment of a pilot control signal is carried out for the pilot control of an electric current for the drive of an electric valve drive for opening the valve in reaction to the adapted opening signal.

One advantage of a good pilot control for a regulation is that the pilot control (taken as such) cannot oscillate. The stability would thus be at least nearly independent of the series tolerances. In addition, however, a regulation is also necessary for an actuation of the valve, because the pilot control cannot sufficiently take into consideration all possible influences which act on the valve.

In step c), the calculation of an actuation signal for actuating the valve drive is carried out. In step d), the calculated actuation signal is output—for example, at the valve drive.

The method is particularly preferred if it furthermore comprises the following step:
b3) receiving an electric current signal which represents an electric current through the valve drive,
wherein the current signal received in step b3) is additionally used in step c) in the calculation of the actuation signal.

In step c), in addition a measured electric current or a parameter (a signal) which is representative of an actual current flowing through the valve drive is received. This electric current or this parameter can be measured and/or only calculated from other measured variables.

In step c), the measured current (measured according to step b3)) and a modeled current (generated according to steps b1) and b2)), which corresponds to reality very well due to the pilot control, are preferably compared to one another during the calculation of the actuation signal and a possible deviation is interpreted in a change of the system parameters (resistance).

In further method steps e) and f), a feedback of system parameters to the pilot control preferably takes place. As described, system parameters (such as the resistance) can be determined by a deviation between the measured current and the calculated current. Further method steps e) and f) can preferably be described as follows.

f) calculating or estimating a new data set of system parameters of the pilot control (for example, resistance).

g) feeding back newly calculated or newly estimated system parameters (in particular the resistance) to the pilot control, in particular also to take into consideration model errors in the pilot control.

Method steps e) and f) can be executed before, after, or in parallel to method step d) with respect to time.

The pilot control signal and the measured electrical current signal preferably merge due to the calculation in step c), in order to calculate a particularly suitable actuation signal for actuating the valve drive in consideration of both signals. This actuation signal is then output in step d).

An output of the actuation signal in particular means in all method variants of the method described here that the actuation signal is provided to the valve drive. The actuation signal can be, for example, an output voltage, which is applied to the valve drive.

The method is particularly advantageous if the pilot control signal is ascertained using a valve model.

A valve model simulates the behavior of the valve at the respective operating point. With the aid of the valve model, the behavior of the valve in reaction to an actuation signal can be predicted. The valve model preferably consists of at least one linear differential equation, which describes the time-delayed behavior of the valve on the actuation signal. This time-delayed behavior relates in particular to the electric current through the valve drive, which changes with a time delay as a result of a change of the actuation signal.

The method is particularly advantageous if the valve model models a first-order delay behavior of the valve.

A first-order delay behavior is also referred to as PT1 behavior. The valve drive can be efficiently recreated as a valve model using a PT1 behavior. A PT1 behavior can be simulated simply and cost-effectively therein. It has been shown that a sufficiently good prediction of the valve behavior in reaction to the actuation signal is possible by way of a PT1 behavior. The valve model can also include multiple delay elements having PT1 behavior, which are linked to one another to simulate the valve behavior. The valve model can also include higher-order delay elements (PT2, PT3, etc.).

It is furthermore preferable if a time constant of the valve model corresponds to a time constant of the valve drive.

Due to corresponding time constants of valve model and valve drive, the valve model recreates the valve drive in its delay behavior. If the valve drive and the valve model have multiple time constants, these time constants preferably also correspond to one another in valve drive and valve model. It is also possible that the valve drive actually has a higher-order delay behavior, which in particular comprises multiple small time constants and is approximated by a PT1 element having a longer time constant.

However, arbitrary other time constants can also be stored in the pilot control, in particular if the pilot control comprises a state variable filter. It is preferable for one of the time constants stored in the pilot control to correspond to the time constant of the "real" valve drive. In particular this time constant is associated with the valve model which simulates the behavior of the "real" valve drive.

The method is also particularly advantageous if an estimation of the electric resistance of the valve drive is used in the valve model.

In addition, the method is particularly advantageous if an estimation of the inductance of the valve drive is used in the valve model.

The resistance can both be permanently stored and also newly estimated in every calculation step. Depending on the environment in which the valve is used, it is advantageous to estimate the resistance in every step, in order to make the pilot control as efficient as possible.

The electric resistance and the inductance of the valve drive very significantly define the delay behavior (PT1 behavior) between a change of the actuation signal and the electric current through the valve drive. It is thus advantageous to take into consideration the estimations of these parameters in the valve model.

The method is particularly advantageous if a pilot control and a regulator are used in step d) to determine the actuation signal.

Moreover, the method is advantageous if an inverse PT1 element is applied in the pilot control.

Furthermore, the method is advantageous if a state variable filter is applied in the pilot control.

The state variable filter is particularly preferably connected upstream of a valve model. The state variable filter is particularly preferably used to carry out step b1), in order to generate the adapted opening signal. The valve model is particularly preferably used to carry out step b2), in order to generate the pilot control signal or, in the case in which no additional regulator is used, also the actuation signal directly, respectively.

The state variable filter is a regulation element which is typically of the same order as the control segment itself. With the aid of the state variable filter, it is possible to generate a desired signal curve which the loop is to assume (preferably the opening state of the valve here). The state variables which are to be applied to the loop with the aid of the pilot control are adapted using the state variable filter so that they take into consideration real physical conditions or in particular also physical limits. An opening signal received in step a) is, for example, a jump function. The real valve cannot be opened suddenly due to design-related physical limits, however. Therefore, an adapted opening signal, which takes into consideration the physical limits, is preferably generated by the state variable filter from the opening signal in step b1). For example, from an opening signal which corresponds to a jump function from (closed) to 1 (open), a corresponding opening signal from 0 to 1 is generated by the state variable filter, which corresponds to a curve of a PT1 behavior.

A control unit is also to be described here for actuating a valve having an electrical valve drive, which is configured to carry out the described method.

The advantages and design features outlined in conjunction with the described method are applicable and transferable to the described control unit. This also applies to the advantages and design features outlined in conjunction with the described control unit, which are applicable and transferable to the described method.

Such a control unit preferably forms an independent module, which is provided or configured to generate a suitable actuation signal for the valve drive as a reaction to an opening signal. The opening signal describes the specification of how the valve is supposed to behave and is typically provided by a higher-order control unit. The control unit discussed here receives the opening signal and preferably additionally a current signal, which represents the actual situation in the valve drive or the actual current present in the valve or in the valve drive.

A computer program is also to be described here, which is configured to execute the method or all steps of the method as claimed in any one of the preceding claims. In addition, a machine-readable storage medium is to be provided, on which the computer program is stored.

BRIEF DESCRIPTION OF THE DRAWINGS

The disclosure and the technical environment are explained in greater detail hereinafter on the basis of the figures. It is to be noted that the figures and in particular the size relationships shown in the figures are only schematic. In the figures.

DETAILED DESCRIPTION

Figure 1:
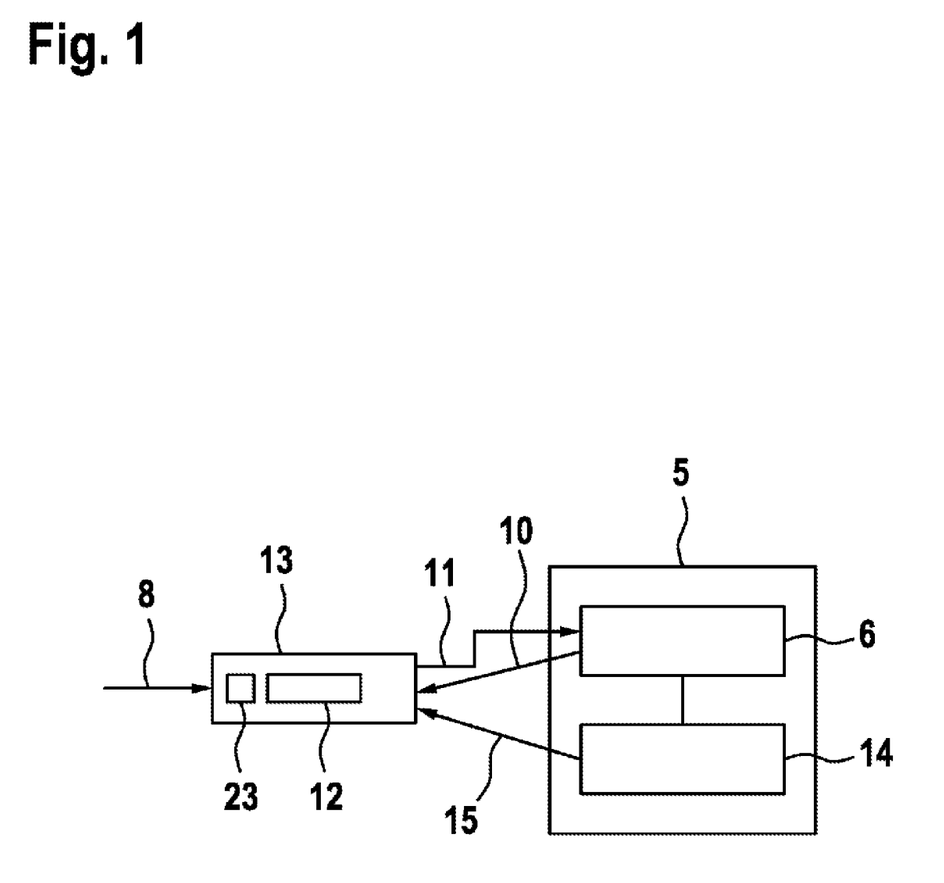
FIG. 1: shows a schematic illustration of a described valve.

FIG. 1 shows a valve 5 having a control unit 13 for actuating this valve 5. The valve 5 has a fluid block 14, which comprises, for example, a line, a bottleneck, and a valve body, using which the valve 5 can be opened and closed. The fluid block 14 or in particular the valve body of the fluid block 14 is controlled by a valve drive 6 of the valve 5. The valve drive 6 is in particular an electric coil or electromagnet, which can exert a magnetic force which acts on the fluid block 14 or in particular on a movable valve body in the fluid block 14 in order to open or close the valve 5 or to change the opening state of the valve 5 in general.

The control unit 13 is configured to receive an opening signal 8. An item of information about how the opening state of the valve 5 is supposed to be changed is preferably contained in the opening signal 8. From the opening signal 8, the control unit 13 generates a suitable actuation signal 11, using which the valve drive is deliberately actuated in reaction to this opening signal 8. To produce the actuation signal 11 suitably, a valve model 12 and a state variable filter 23 are stored in the control unit 13. Further details on the linking of valve model 12 and state variable filter 23 are described hereinafter on the basis of the further figures. The control unit 13 can additionally be configured to detect valve parameters 15. Valve parameters 15 are measured actual parameters of the valve operation. The values of such parameters can be taken into consideration in the production of a suitable actuation signal 11. In addition, the control unit 13 can receive a current signal 10, which represents the current presently flowing through the valve drive 6. A current signal 10 of the valve drive 6 is also very advantageous to ascertain suitable actuation signals 11 for the valve drive 6.

Figure 2:
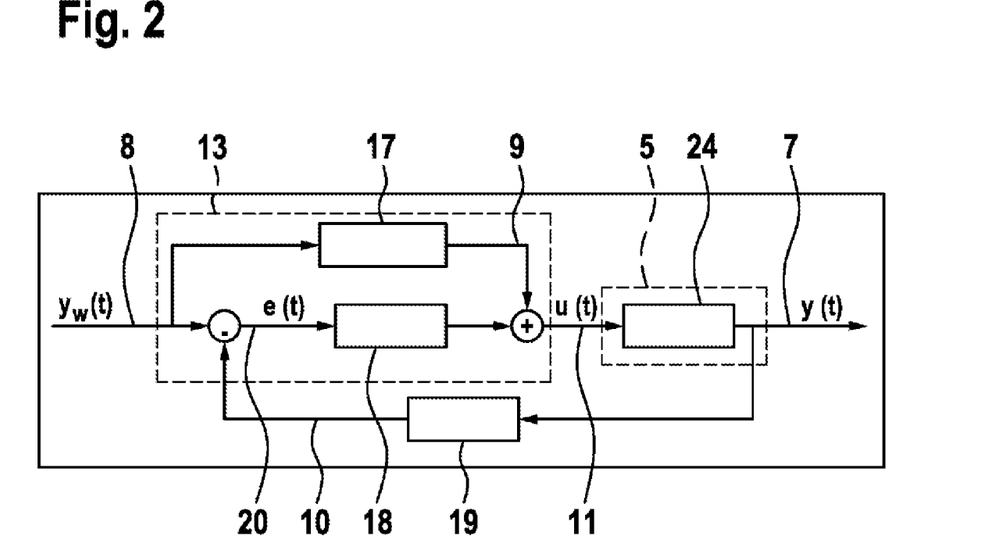
FIG. 2: shows a regulation of a segment using a regulator and a pilot control.

FIG. 2 shows a general illustration of a control loop having a pilot control 17 and a regulator 18 for controlling a segment 24. The segment 24 corresponds to the valve 5 or the valve drive. Particularly rapid, efficient, and accurate regulation of the segment 24 is achieved by the combination of pilot control 17 and regulator 18. The control unit 13 described in FIG. 1 is formed by the regulator 18 and the pilot control 17. An opening signal 8 is switched from the left on the regulator 18 and the pilot control 17. The pilot control acts directly on the segment 24. The segment 24 is monitored using a sensor 19. This can be, for example, a current sensor, which generates a current signal 10, which is based on the electric current 7, which is observed here as an output variable of the segment 24. A regulating error 20 is calculated from the current signal 10 and the opening signal 8, which is used as the input variable for the regulator 18. An actuation signal 11 for the segment 24 (the valve 5 or the valve drive of the valve 5) is determined from the pilot control signal ascertained by the pilot control 17 and the output of the regulator 18. It is assumed here that the regulator block also includes the actuator.

Figure 3:
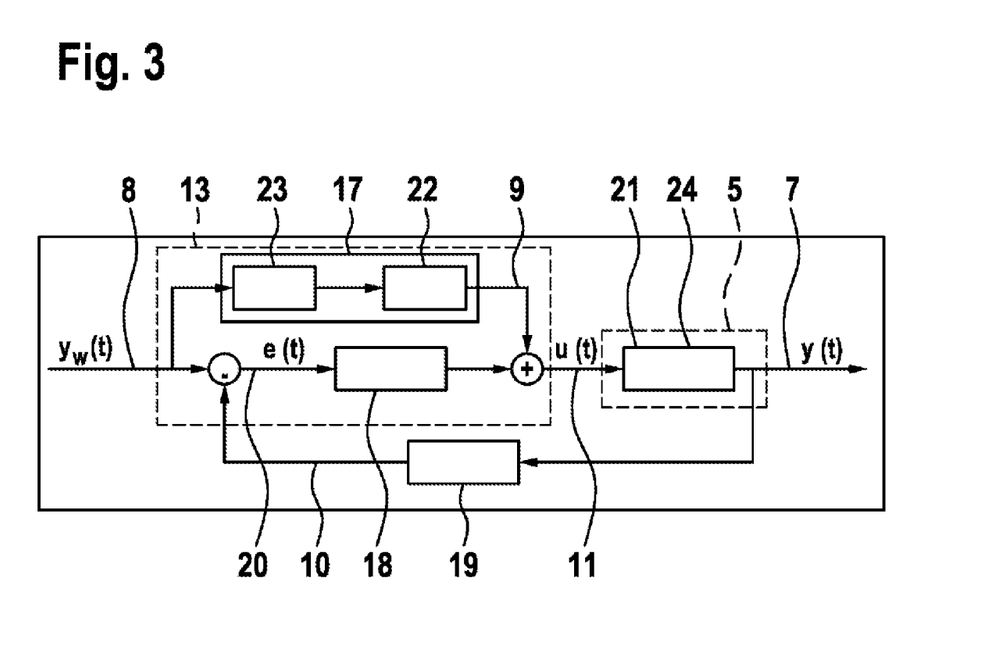
FIG. 3: shows a regulation of a PT1 segment using a regulator and a pilot control.

The regulator 18 is also shown as part of the overall circuit in FIG. 3. However, embodiment variants without regulator 18 are also possible, in particular if the pilot control is sufficiently accurate or even possibly has an interference variable compensation, which enables it to compensate for interference variables in such a way that additional regulation is no longer necessary.

FIG. 3 shows a variant of the control loop from FIG. 2, wherein identical elements are identified here by identical reference signs. The segment 24 is adopted here as the PT1 element 21.

The pilot control here is a combination of state variable filter 23 and inverter 22. Such a pilot control is also referred to as predictive pilot control. The state variable filter 23 calculates a signal curve, which can also be called a "trajectory". This signal curve or this trajectory corresponds to a desired curve in consideration of physical limits, which the state variables 7 are to fulfill. The trajectory is converted into the actual manipulated variable using the inverter 22.

Figure 4:
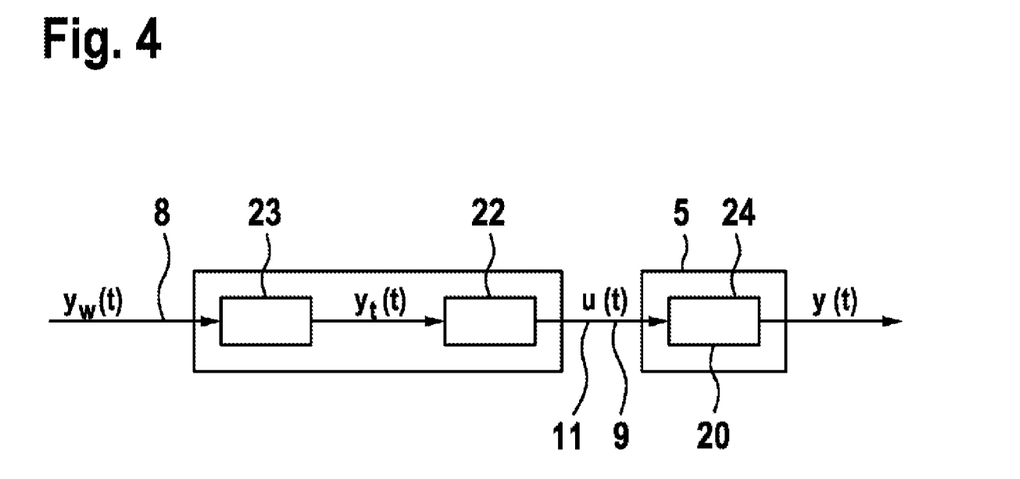
FIG. 4: shows a control of a segment, having predetermined signal curve yt(t)

FIG. 4 illustrates a pilot control 17 alone for the control of a segment 24 without a regulator being provided. The identifications of the individual elements correspond to FIG. 2 and FIG. 3.

The effect of the state variable filter 23 is to be explained on the basis of FIG. 4. The following variables are relevant for the state variable filter 23.

$y_w(t)$=time target value curve which the output variable is supposed to assume. This corresponds, for example, to the opening signal, $y_t$ (t)=time curve which the output variable can physically assume maximally, and this corresponds, for example, to the adapted opening signal, u(t)=manipulated variable u(t) so that y(t)=$y_t$(t). This corresponds, for example, to the pilot control signal or the actuation signal.

A PT1 behavior can be described as follows:

$$T_1 \cdot \frac{d}{dt} y(t) + y(t) = K \cdot u(t)$$

Figure 5:
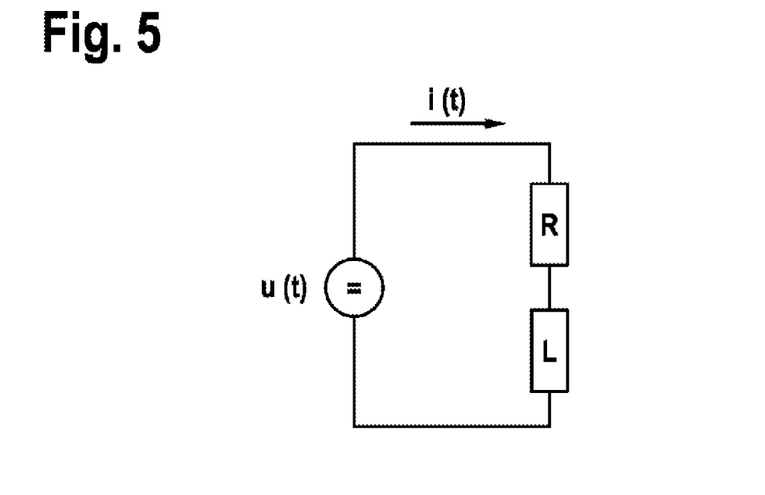
FIG. 5: shows an example of a segment to be regulated.

The segment described in FIGS. 2 to 4 is explained briefly for the case discussed here of a valve or a valve drive as the segment to be regulated in FIG. 5. FIG. 5 shows a diagram of the electrical properties of a valve drive having resistance R, inductance L, applied voltage U, and current i resulting from the voltage. The solenoid of the valve drive is thus electrically described. The solenoid valve coil can be described as shown in FIG. 5. The following differential equation thus results:

$$T_1 \cdot \frac{d}{dt} i(t) + i(t) = K \cdot u(t)$$

One now wishes to select u(t) so that the desired starting behavior results. One thus requires a block which outputs the desired signal u(t) as the output to achieve y(t). This is achieved by an inverter block, which has u(t) as the output but requires i(t) and $$\frac{d}{d(t)} i(t)$$

as input variables therefor.

Figure 6:
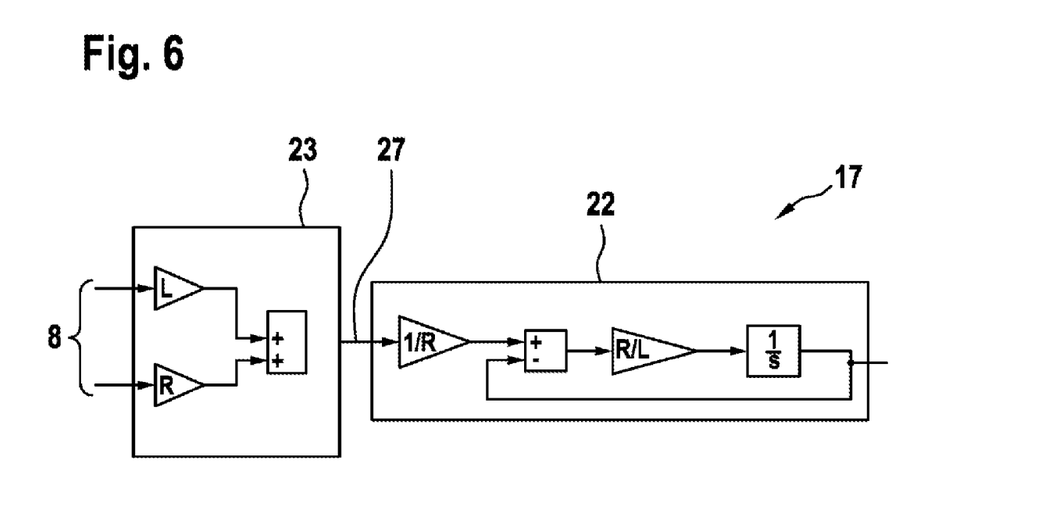
FIG. 6: shows an inverter with a segment.

The illustration of segment and inverter block is shown in FIG. 6, where the pilot control 17 is shown once again having the inverter 22 and the state variable filter 23. For example, adapted opening signals 27 are relayed by the state variable filter 23 to the inverter 22, which were ascertained by the state variable filter from opening signals 8 (step b11). The inverter 22 then carries out step b2).

It is now necessary to calculate the input variables i(t) and $$\frac{d}{d(t)} i(t)$$

for a desired output behavior y(t) so that the desired behavior results or it is physically possible at all to set the desired behavior. The block which provides this is the described state variable filter 23, which can also be referred to as a signal generator. The state variable filter 23 has a signal $y_w(t)$ as an input and calculates the output variables i(t) and $$\frac{d}{d(t)} i(t),$$

so that they can be fed directly into the above-mentioned inverter block.

Figure 7:
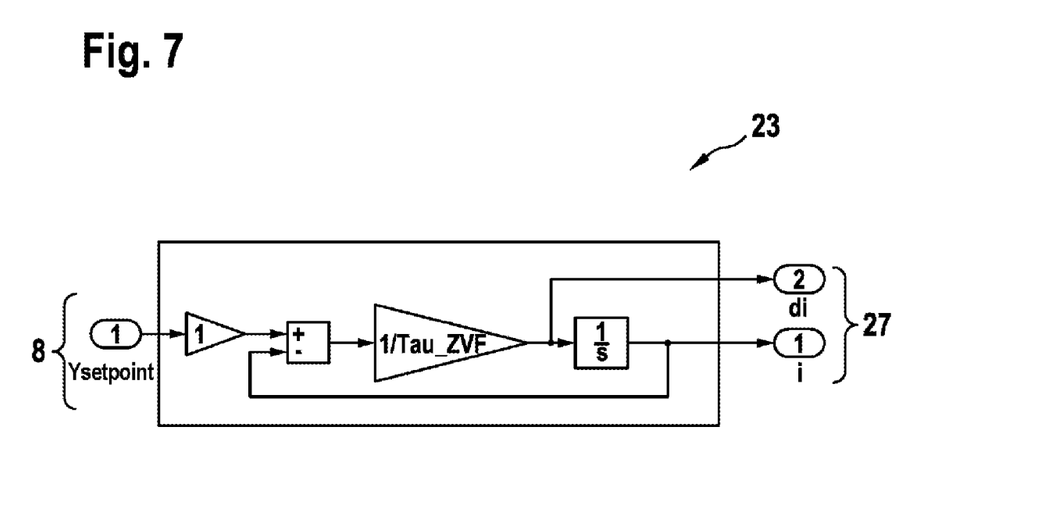
FIG. 7: shows a state variable filter without manipulated variable limiting.

This state variable filter 23 is shown once again in greater detail in FIG. 7. If the control segment has a PT1 behavior, a PT1 behavior can also be used for the state variable filter 23. The loop amplification of the state variable filter 23 is "1", and the dynamic response of the behavior can be defined via a time constant of the state variable filter 23 "Tau_ZVF"="time constant of the state variable filter". Generally, the manipulated variable (in this case the voltage in the vehicle) is now limited. If one takes into consideration this manipulated variable limiting (i.e., the maximum possible voltage) directly in the state variable filter 23, this thus causes limiting of the maximum gradients of the current. The maximum possible voltage of the maximum possible gradients can form a vector, which is considered here as a whole as an adapted opening signal 27. In principle (in all embodiment variants), the adapted opening signal 27 can be a vector which comprises multiple individual variables relating to the opening state of the valve. In principle (in all embodiment variants) the opening signal can also be a vector, which comprises multiple individual variables relating to the opening state of the valve.

Figure 8:
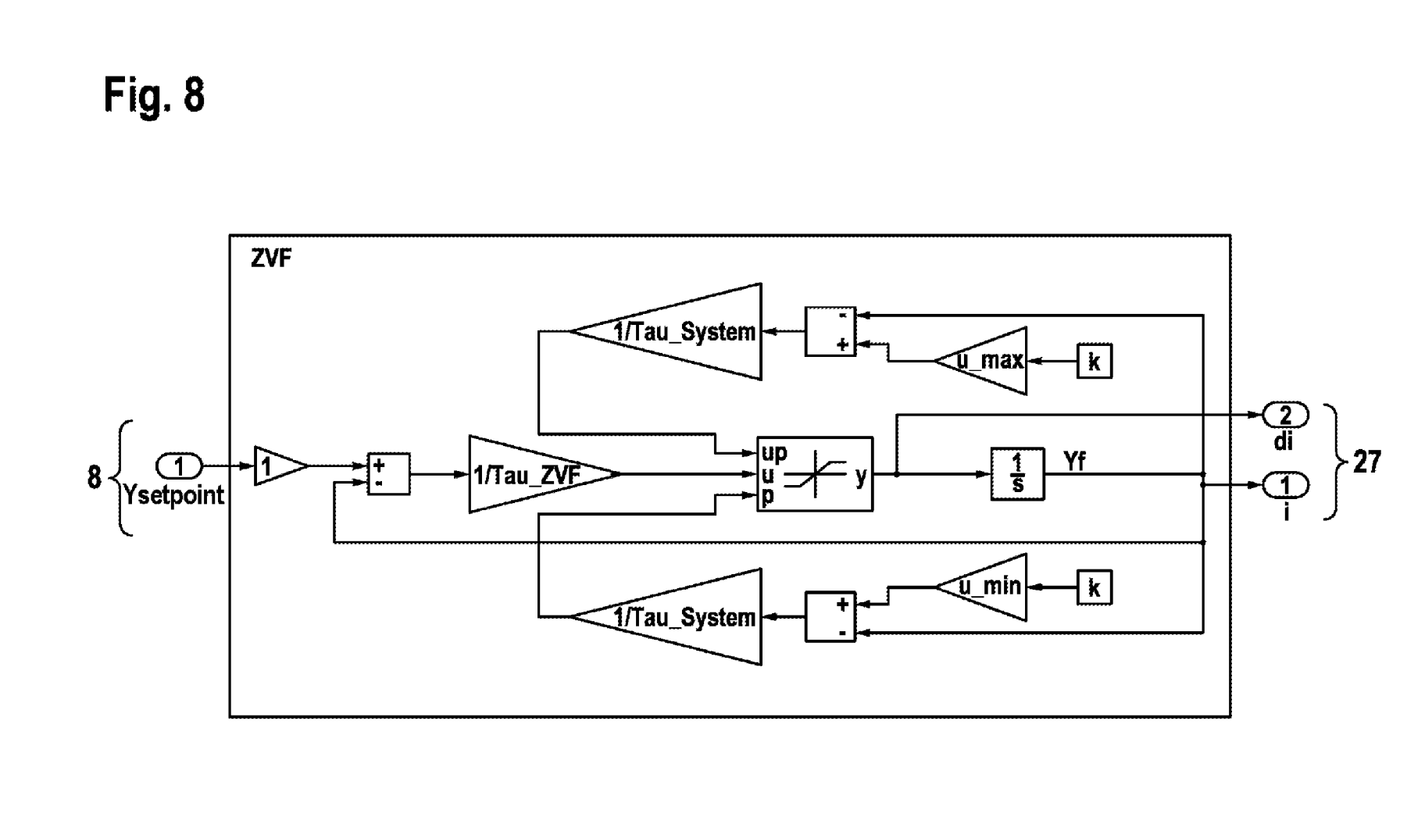
FIG. 8: shows a state variable filter with actuator limiting.

FIG. 8 shows a further embodiment variant of a state variable filter 23, which generates the adapted opening signal 27 from the opening signal 8. In this variant of a state variable filter 23, manipulated variable limiting takes place, which is used for the purpose, for example, of taking into consideration physical limits. In combination of the state variable filter 23 with the inverter block, this has the effect that the manipulated variable limiting can be maximally utilized.

Figure 9:
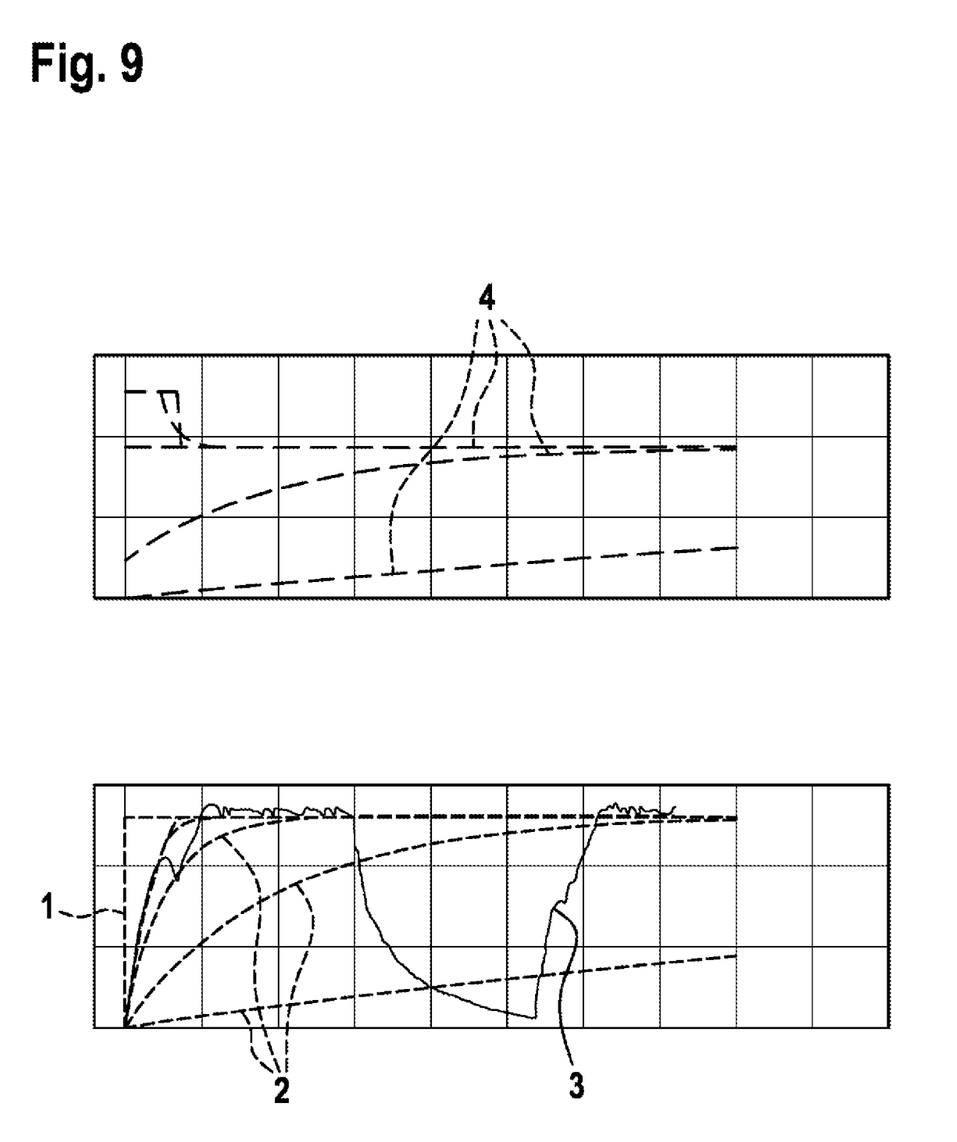
FIG. 9: shows a jump response behavior solely with a pilot control (without regulator) but state variable filters having different data.
Figure 10:
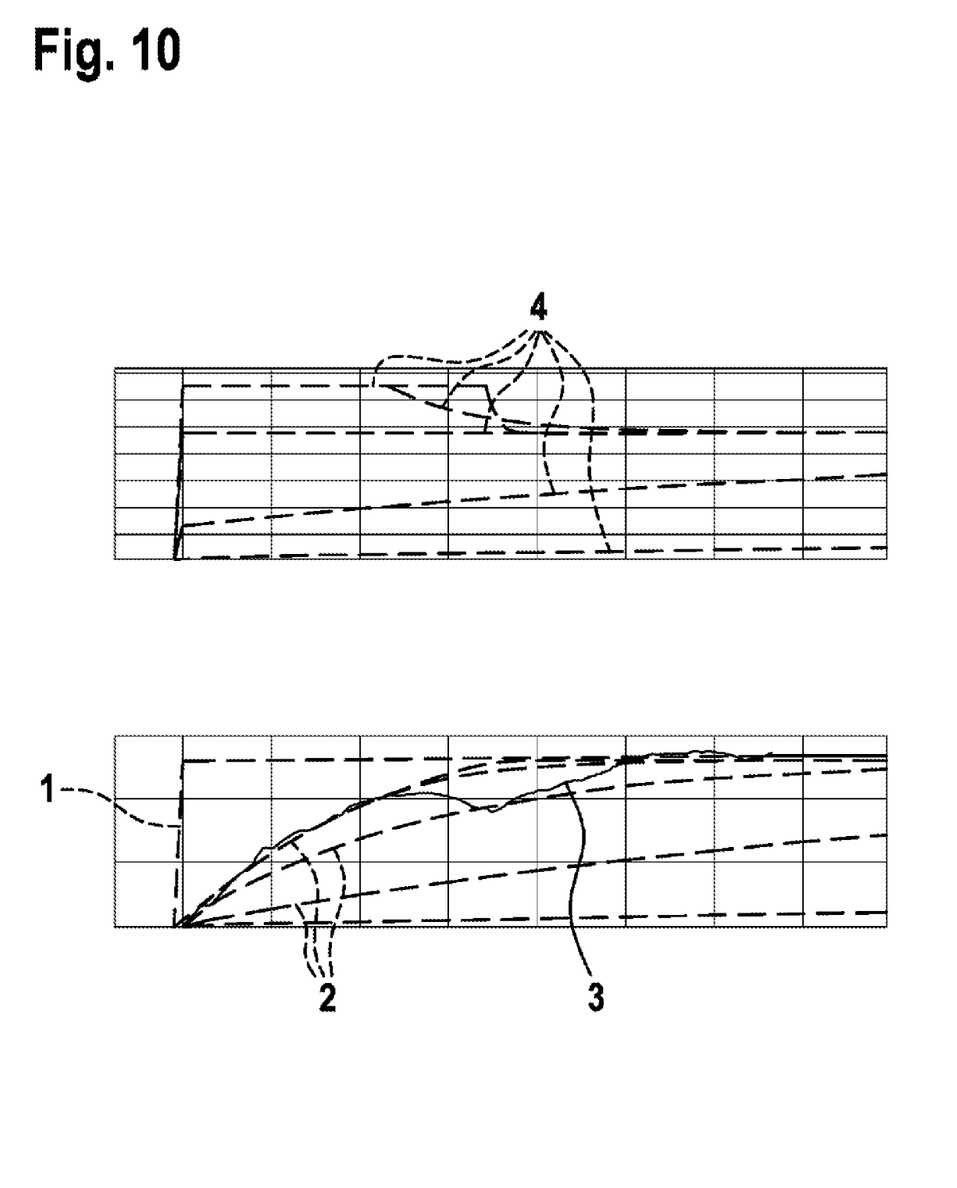
FIG. 10: shows a jump response behavior corresponding to FIG. 9 in a different representation.

The use of an actuation to actuate a valve drive using state variable filter 23 results in the jump response behavior shown in FIG. 9 and FIG. 10. According to FIG. 9 and FIG. 10, the response behavior is simulated in each case without using a regulator in addition to the pilot control. For comparison, the behavior with a regulator (3) is plotted in each of the diagrams.

The images in FIG. 9 and FIG. 10 show the results of an overall system behavior using the actuation concept described here and the regulating method described here consisting of state variable filter, inverter block, and a segment having PT1 behavior.

The upper portion of the diagrams in each of the figures shows the time behavior of the manipulated variable 4 with various time constants of the state variable filter. The lower portion of the diagrams in the figures shows the following signals:

the setpoint jump (1), which is output as a specified value to the system consisting of pilot control and segment.

The actual curve of the current (3), which results as a response to the setpoint jump (1). The current (3) was plotted here for comparison of the dynamic response and was regulated using a standard PI regulator.

The calculated curve of the output current (2), which is achieved by simulation of the system made up of pilot control and segment.

FIG. 9 and FIG. 10 show the illustration of a jump response with various time constants of the state variable filter without additional regulator. FIG. 10 shows the same behavior as FIG. 9. However, FIG. 10 shows the starting interval of the behavior shown in FIG. 9 in detail in an elongated illustration.

The illustration of the jump responses is to show that the same dynamic response is achieved at the time of the actuation solely using a pilot control as using an actuation concept with PI regulator, which is very dynamically designed. The curve profiles 4 each show the simulated response behavior using a pilot control. The curve profiles 3 each show a real measured response behavior which can be achieved using a PI regulator.

It can be seen from the simulation results in the lower plot that it is possible to achieve the same dynamic response by way of a corresponding pilot control (state variable filter and inverter of the segment) as using a regulator of a typical type without pilot control, which is very aggressively designed. To this end the time constant must be selected correspondingly at the state variable filter. The great advantage of the pilot control here, however, is that the pilot-controlled output variable without overshoots sets the setpoint value. This cannot be achieved using a conventional regulator at this speed.

Moreover, in a concept with a pilot control comprising a state variable filter, the dynamic response can be deliberately selected/adapted situationally, so that either very high dynamic response or very low dynamic response can be predetermined. The deliberate setting of a low dynamic response can be advantageous to achieve noise-optimized switching.

Various manipulated variable curves 4 can be seen in the upper plot of FIG. 9 and FIG. 10, which show the curve of the manipulated variable at various time constants of the state variable filter. If the state variable filter has the same time constant as the segment itself, the jump at the input is also output as the jump at the output, however with the corresponding amplification which is necessary to reach the final value (here u=R·y w). If the time constant of the state variable filter (with consideration of the actuator limiting) is less than the time constant of the segment, it can thus be recognized on the upper plot that the manipulated variable is nearly automatically kept at the maximum of the actuator as long as necessary.

The concept described here of the pilot control for valve actuations can be used in particular for braking control systems. In braking control systems, it is possible to use the concept in particular for the following purposes:
  valve actuation solely using pilot control
  valve actuation using pilot control and regulator (regulator optimized for regulating out the regulation deviation or interference variables)
  as a valve actuation having special requirements for the current curve (trajectory planning of the current).

In addition, this concept is usable in nearly all applications with solenoid valves. It is appropriate in particular if the requirements for the time constant of the segment are high.

Moreover, additionally carrying out further above-described additional method steps f) and g) is advantageous, comprising returning the estimated or calculated system parameter (in particular the system parameter resistance). It can be ensured by these additional steps that depending on the design of the observer, the resistance adapts within a few milliseconds. This means that a deviation of the resistance can already be regulated out within one ABS actuation cycle. Such an actuation cycle has a length, for example, of approximately 200 ms.

A linearized implementation of the underlying concept of the method described here in hardware can be described by the following equations.

Step 1 calculates the setpoint trajectory of the current.

$$I_{setpointk} = I_0 + \frac{dt}{\tau_{ZVF}} \cdot (I_{setpoint} - I_0)$$

Step 2 calculates the required (actuation) voltage for the setpoint trajectory of the current.

$$U_k = R \cdot \left( \frac{\tau_{LR}}{dt} \cdot (I_{setpointk} - I_0) + I_0 \right)$$

The third step limits the voltage to the maximum available voltage $$U_{lim} = \lim(min, max, U_k)$$

The fourth step now calculates the maximum possible current which is possible due to the limiting of the voltage.

$$I_{actualk} = I_0 + \frac{dt}{\tau_{LR}} \cdot \left( \frac{U_{lim}}{R} - I_0 \right)$$

Since deviations arise in real use, due to tolerances and component variations and naturally also due to changes of the environmental conditions, which cannot all be detected, a combination of pilot control and regulator is advisable, as is also shown in particular in FIG. 3.

The regulation approach provided here is to regulate out the changes (resistance, voltage, etc.), which cannot be compensated for by the pilot control, in the case of a valve actuation as occurs in many applications. In the first approach, a Luenberger observer structure is used, which is supplemented, however, by a resistance estimation.

Figure 11:
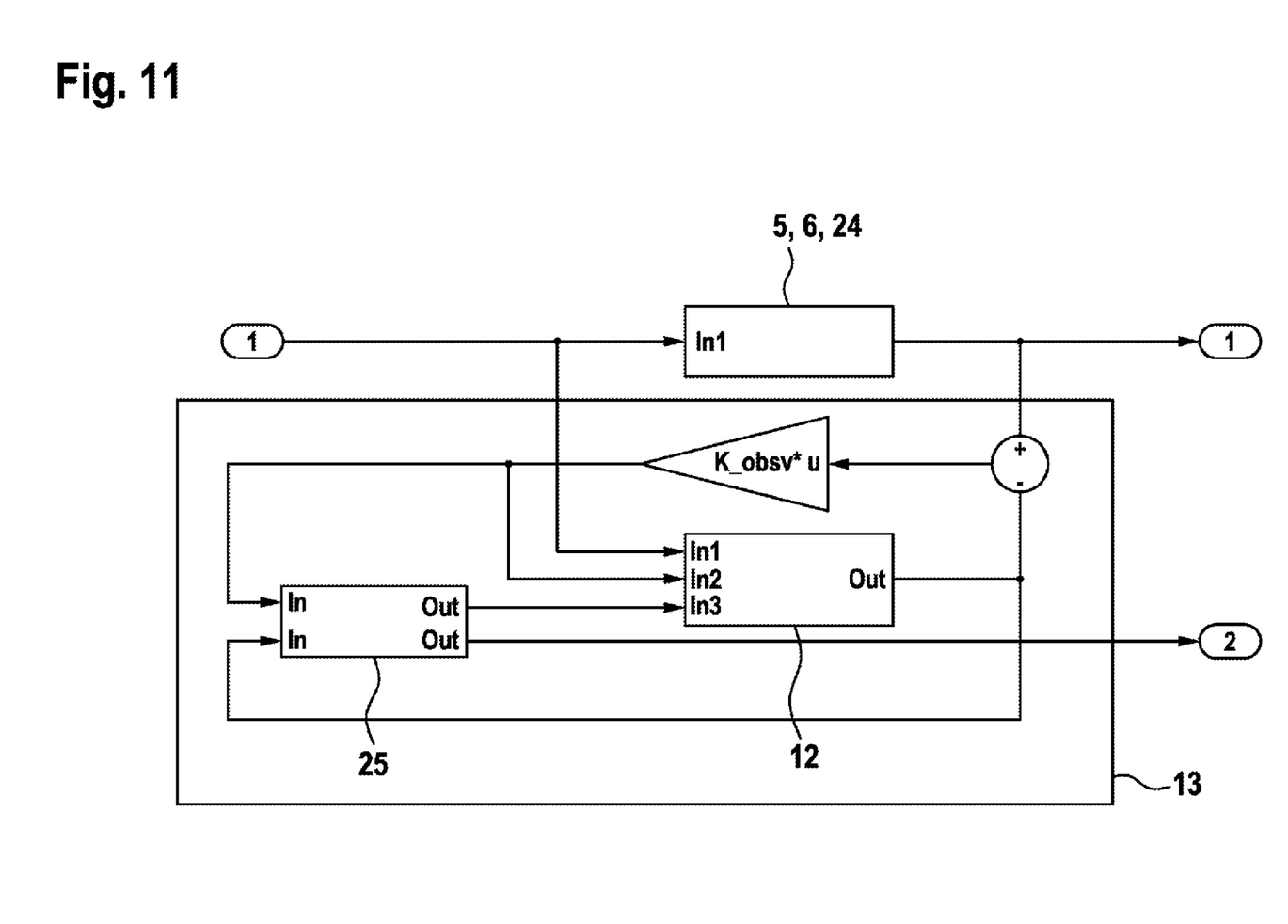
FIG. 11: shows a control concept having a segment observation for the pilot control and resistance estimation.

FIG. 11 shows the comprehensible structure of real segment 24 comprising the valve 5 and the valve 6 and the valve model 12 adjacent to them, which is implemented by this implementation in hardware in a control unit 13. The valve model 12 can also be supplemented by a so-called observer, which permanently monitors the real segment 24 and brings the valve model 12 and the real segment 24 into correspondence. The observer is used to observe the behavior of the segment 24 and/or of the valve 5 and/or of the valve drive 6. The observer is also implemented in the valve model 12.

In the first step, the current deviation is interpreted as a resistance deviation, the correction variable and unit is contained in the amplifier gain K_Observ. Subsequently, the $\Delta R$ is integrated and the term $R+\Delta R$ is formed. A fracdiff is now furthermore calculated therefrom by skilled reconfiguration, which is then also incorporated in the observer.

Step 1:

$$\frac{R + \Delta R}{L}$$

Step 2:

$$\frac{R + \Delta R}{L} \cdot I = \frac{R + \Delta R}{L} \cdot \frac{U}{R + \Delta R}$$

Step 3:

$$\frac{R + \Delta R}{L} \cdot \frac{U}{R + \Delta R} = \frac{U}{L} = \frac{di}{dt}$$

The invention claimed is:

1. A method for actuating a valve using an electromagnetic valve drive, through which electric current is conducted in order to open the valve, to close the valve, or to hold the valve in an open or closed position, the method comprising:
  receiving an opening signal, the opening signal representing target values over time for a state of the valve;
  ascertaining, based on the opening signal, an adapted opening signal, the adapted opening signal representing values over time that the state of the valve that can physically be assumed according to physical limitations of the valve or the electromagnetic valve drive;
  ascertaining, based on the adapted opening signal, a pilot control signal for pilot control of the electric current to drive the electromagnetic valve drive to open the valve in reaction to the adapted opening signal;

calculating an actuation signal to actuate the electromagnetic valve drive using the pilot control signal; and outputting the actuation signal.

2. The method as claimed in claim 1, further comprising:

receiving an electric current signal representing the electric current through the electromagnetic valve drive; and wherein the actuation signal is calculated using the electric current signal and the pilot control signal.

3. The method as claimed in claim 1, further comprising: ascertaining the pilot control signal using a valve model.

4. The method as claimed in claim 3, wherein the valve model models a first-order delay behavior of the valve.

5. The method as claimed in claim 3, wherein a time constant of the valve model corresponds to a time constant of the electromagnetic valve drive.

6. The method as claimed in claim 3, wherein an electric resistance of the electromagnetic valve drive is estimated in the valve model.

7. The method as claimed in claim 3, wherein an inductance of the electromagnetic valve drive is estimated in the valve model.

8. The method as claimed in claim 1, wherein a pilot control and a regulator are used to calculate the actuation signal.

9. The method as claimed in claim 8, further comprising: applying an inverse PT1 element in the pilot control.

10. The method as claimed in claim 8, further comprising: applying a state variable filter in the pilot control.

11. The method as claimed in claim 1, wherein a control unit for actuating the valve is configured to carry out the method.

12. A non-transitory machine-readable storage medium that stores a computer program for actuating a valve using an electromagnetic valve drive, through which electric current is conducted in order to open the valve, to close the valve, or to hold the valve in an open or closed position, the computer program, when executed by a controller, causing the controller to:

receive an opening signal, the opening signal representing target values over time for a state of the valve;

ascertain, based on the opening signal, an adapted opening signal, the adapted opening signal representing values over time that the state of the valve that can physically be assumed according to physical limitations of the valve or the electromagnetic valve drive;

ascertain, based on the adapted opening signal, a pilot control signal for pilot control of the electric current to drive the electromagnetic valve drive to open the valve in reaction to the adapted opening signal;

calculate an actuation signal to actuate the electromagnetic valve drive using the pilot control signal; and output the actuation signal.

* * * * *

UNITED STATES PATENT AND TRADEMARK OFFICE
CERTIFICATE OF CORRECTION

| | |
|---|---|
| PATENT NO. | : 11,650,606 B2 |
| APPLICATION NO. | : 17/048663 |
| DATED | : May 16, 2023 |
| INVENTOR(S) | : Schanzenbach et al. |

It is certified that error appears in the above-identified patent and that said Letters Patent is hereby corrected as shown below:

On the Title Page

On Page 2, under Item (56) References Cited, under the subheading FOREIGN PATENT DOCUMENTS:
At Line 6, "DE 0261134" should read --EP 0261134--; and
At Line 9, "DE WO99/10975" should read --WO 99/10975--.

Signed and Sealed this
Twelfth Day of September, 2023

Katherine Kelly Vidal
*Director of the United States Patent and Trademark Office*